March 10, 1970     E. VAL VERDE     3,499,395
ADJUSTABLE LOAD SPACER

Filed Jan. 4, 1968     2 Sheets-Sheet 1

INVENTOR
EMANUEL VAL VERDE
BY
Edward C. Shreedy
HIS ATTORNEY

March 10, 1970  E. VAL VERDE  3,499,395
ADJUSTABLE LOAD SPACER
Filed Jan. 4, 1968  2 Sheets-Sheet 2
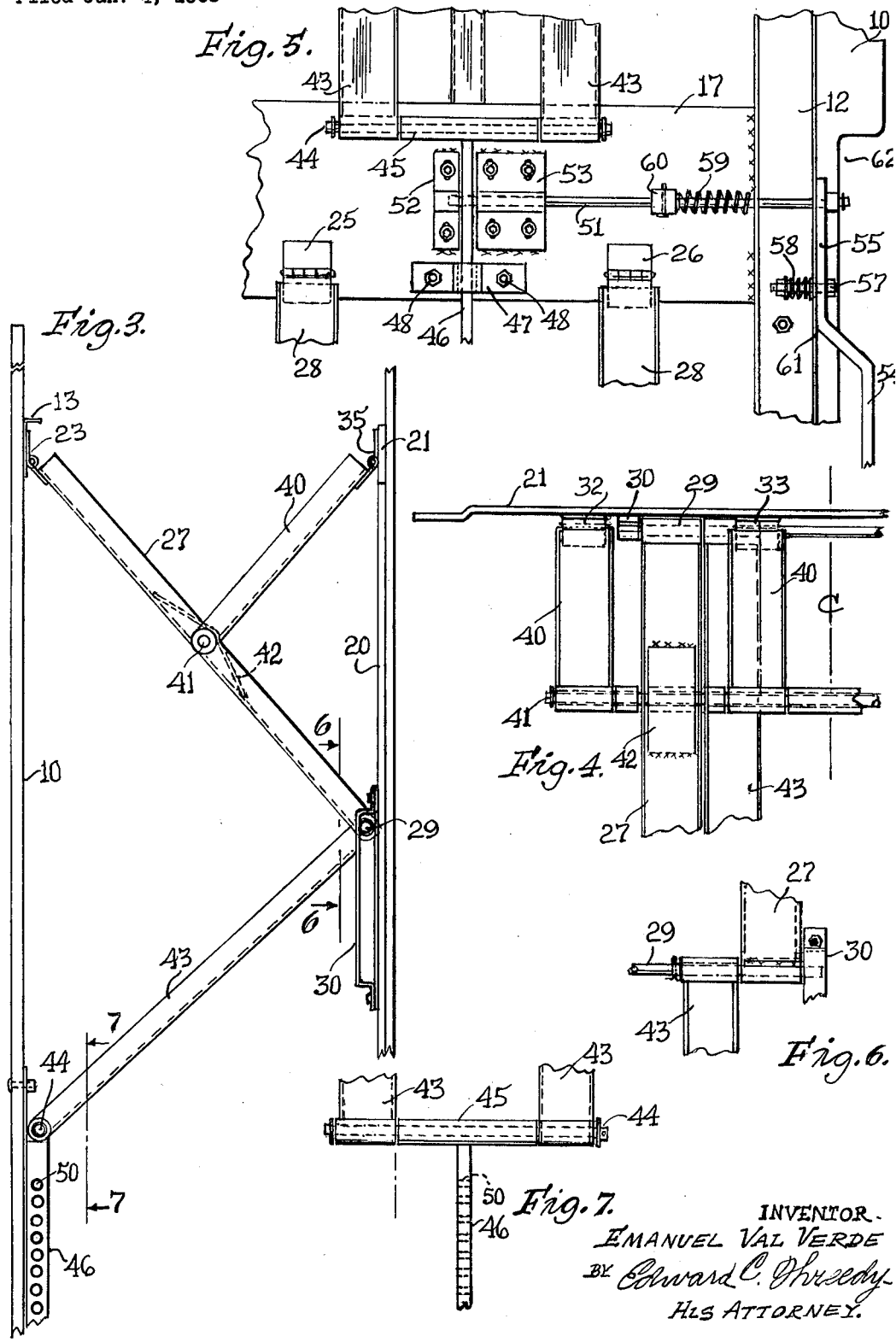
INVENTOR.
EMANUEL VAL VERDE
BY Edward C. Ohrzedy
HIS ATTORNEY.

United States Patent Office 3,499,395
Patented Mar. 10, 1970

3,499,395
ADJUSTABLE LOAD SPACER
Emanuel Val Verde, Chicago, Ill., assignor to Transco Inc., Chicago, Ill., a corporation of Delaware
Filed Jan. 4, 1968, Ser. No. 695,727
Int. Cl. B61d 45/00
U.S. Cl. 105—369      3 Claims

ABSTRACT OF THE DISCLOSURE

An adjustable load spacer for use in freight hauling vehicles and the like wherein it is required to have a wall panel section movable inwardly in contact with lading to prevent the same from shifting or becoming damaged during transit.

The adjustable load spacer provides a frame connected to the wall surface of the vehicle or freight compartment and a corresponding frame carried on the confronting face of the spacer panel. A pair of spreader arms separate the frames and also provide latch arms that have extended therebetween a latch bar for releaseably latching the panel in any extended position with respect to the wall surface of the vehicle or freight compartment.

SUMMARY OF THE DISCLOSURE

A load spacer comprising a panel supported by a suitable frame which in turn provides a plurality of hinged braces which cooperate with stationary and movable hinge connections between the panel and a supporting frame mounted on the side wall of the vehicle. A convenient releaseable latch is provided, and it cooperates with the hinged supports so that the panel may be adjusted in a vertically disposed horizontally spaced distance from the vehicle wall and in restraining contact with the lading therein.

The invention will be best understood by reference to the accompanying drawings in which:

FIG. 3 is a fragmentary side elevational view of certain parts of the invention in extended condition;

FIG. 4 is a fragmentary top plan view of certain of the parts in their extended position;

FIG. 5 is a fragmentary plan view of the releaseable latch mechanism of the invention;

FIG. 6 is a fragmentary sectional view taken on line 6—6 of FIG. 3; and

FIG. 7 is a fragmentary sectional view taken on line 7—7 of FIG. 3.

Figure 1:
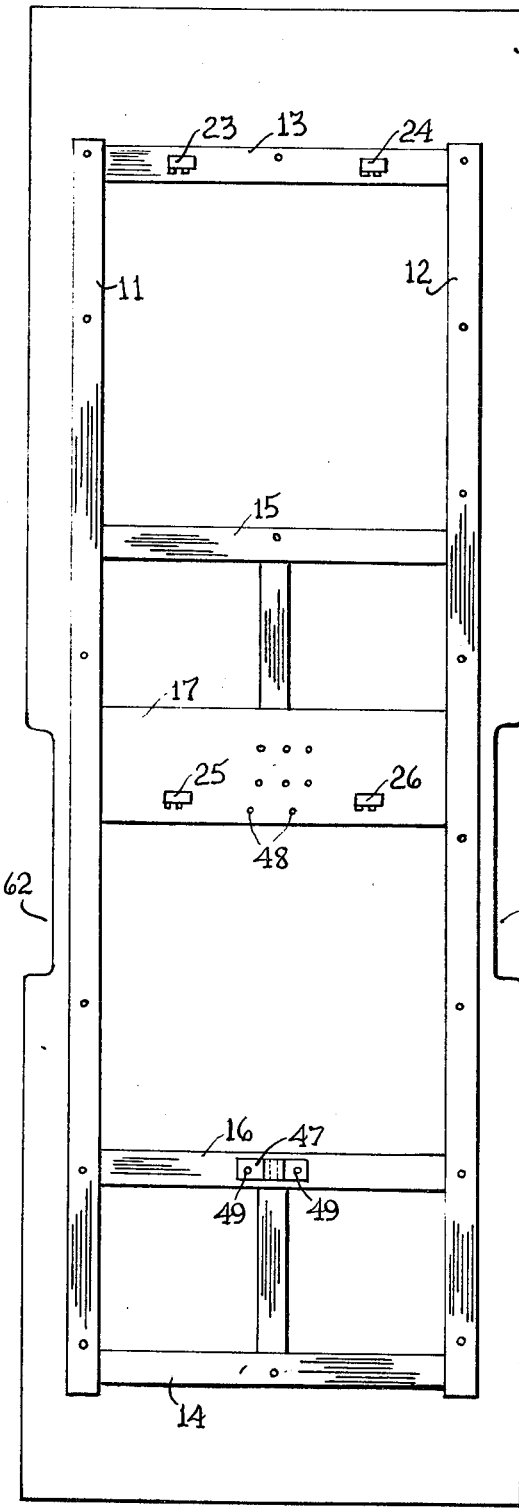
FIG. 1 is an elevational view of the panel and connecting frame.

As shown in FIG. 1 a divider front panel 10 carries a connecting frame consisting of parallel side rails 11 and 12, top, bottom and intermediate cross rails, 13, 14, 15 and 16, respectively, as well as a center support plate 17.

Figure 2:
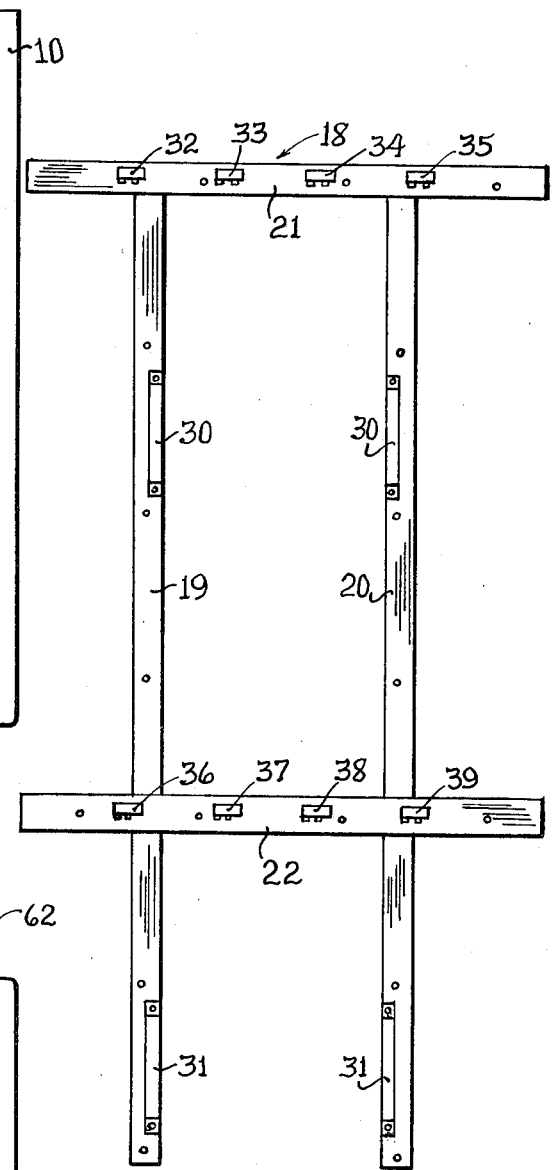
FIG. 2 is an elevational view of the supporting frame which is carried by stationary side wall.

Adapted to be carried by the side wall of a freight vehicle or storage compartment and as shown in FIG. 2 is a stationary support frame 18 comprising parallel side members 19 and 20 and a top and intermediate supporting arm 21 and 22, respectively.

The top cross rail 13 and center support plate 17 carry hinge sets 23, 24, 25 and 26. Pivoted to the hinge sets 23 and 24 are upper spreader arms 27, one of which is shown in FIG. 3. Corresponding lower spreader arms 28 are pivotally connected to the hinge sets 25 and 26 on the center support plate 17 as shown in FIG. 5.

Both upper and lower spreader arms 27 and 28 have their corresponding free ends journaled on shafts, like the shaft 29 shown in FIG. 3. These shafts have their opposite ends movably contained in guide brackets 30 and 31 carried by the side members 19 and 20 of the frame 18 as shown in FIG. 2.

Pivoted to hinge sets 32, 33, 34 and 35 carried by the top supporting arm 21 of frame 18, and hinge sets 36, 37, 38 and 39 carried by the intermediate supporting arm 22 of support frame 18 are sets of braces 40, one set of braces 40 is shown in FIG. 4, and as there seen, have their free ends journaled on a shaft 41 which is in turn contained in brackets 42 carried by the spreader arms 27 and 28.

Mounted on the shaft 29 is one end of each of a pair of latch arms 43. The opposite ends of the latch arms 43 are journaled on a rod 44 which in turn supports a center bushing 45 of a latch bar 46, as seen in FIG. 7. The latch bar 46 is of such a length as to extend between and beyond the intermediate cross rail 16 and center support plate 17 of the connecting frame carried by the panel 10. In this regard retaining brackets 47 for the latch arms 46 are connected as at 48 to the center support plate 17 (see FIG. 5), and at 49 to the intermediate cross rail 16 (see FIG. 1).

The latch bar 46 as fragmentarily shown in FIG. 3 has formed throughout its length a series of openings 50 for the reception of the free end of a lock pin 51. The lock pin 51 is freely carried by brackets 52 and 53 mounted on the center support plate 17 in spaced relation and to either side of the latch bar 46 as shown in FIG. 5.

The lock pin 51 extends through the side rail 12 and is connected to one end of a latch handle 54. The latch handle 54 provides a flat end section 55 which lies in facial abutment with the side rail 12, and is then offset laterally to provide an intermediate section 56 which terminates into the latch handle 54. The latch handle 54 has a limited movable connection to the side rail 12 by means of a nut and bolt 57 which is journaled through an enlarged hole in the side rail 12 so as to have a loose connection therein. A coil spring 58 is disposed between the nut on the bolt 57 and the side rail 12 so as to yieldably hold the handle 54 on to the side rail 12.

The latch pin 51 is also yieldably connected to the side rail 12 by a spring 59 which is coiled upon the pin 51 and held in an expanding condition by a bearing 60 mounted on the pin 51 as seen in FIG. 5.

The latch handle 54 at the junction between the flat end section 55 and the intermediate offset portion 56 provides a cam shoulder 61, the purpose and function of which will hereinafter be described.

When the load spacer is constructed as heretofore described with the parts in operative connection, one to the cut-out handle side portions 62, and at the same time grasp the latch handle 54 which is exposed through one of the latch cut-outs 62, and pivot the free end of the handle 54 inwardly in the direction of the side rail 12. This movement will cause the handle to pivot on its cam shoulder 61 so that the free flat end 55 of the handle 54 will move outwardly of the side rail 12 as seen in FIG. 5, and withdraw the latch pin 51 from out of any of the openings 50 formed in the latch bar 46. In this condition the panel 10 is free to be moved toward or away from the side wall. In moving the panel 10 with respect to the side wall, the upper and lower spreader arms 27 and 28 will pivot about their respective hinge connections, and have their opposite end as connected to the shaft 29 move through the guide brackets 30 and 31. The braces 40 will likewise pivot about their hinged connections and the latch arms 43 will move with the spreader arms 27 and 28. Movement of the latch arms 43 will cause the latch bar 46 to move vertically through its retaining brackets 47 until the latch handle 54 is released and the lock pin 55 projected into one of the openings 50 in a manner to lock the panel in its desired position.

While I have illustrated and described the preferred form of construction for carrying my invention into effect, this is capable of variation and modification without departing from the spirit of the invention.

Having thus described my invention, what I claim as new and desire to protect by Letters Patent is:

1. An adjustable load spacer for freight receiving chambers defined in part by a floor and side walls and a freight engaging panel having a normally vertically disposed position with respect to the floor and a horizontally aligned extended or retracted position with respect to the side walls, wherein the improvement comprises:
    (a) a connecting frame mounted on one side wall surface of the freight engaging panel,
    (b) a supporting frame fixedly mounted on the side wall of the freight receiving chamber,
    (c) a pair of spreader arms each having one end hingedly connected to said connecting frame and their opposite ends attached to said supporting frame for limited movement with respect thereto,
    (d) means for attaching said opposite ends of said spreader arms to said supporting frame for limited movement longitudinally with respect thereto,
    (e) a pair of latch arms each having one end pivotally connected to said opposite ends of said spreader arms and movable therewith relative to said supporting frame,
    (f) a latch bar connected to the other ends of each of said latch arms and movable therewith through a vertical plane as the panel is moved relative to the side wall,
    (g) means slidably connecting said latch bar to said connecting frame for movement vertically with respect thereto as said hingedly connected ends of said spreader arms are limitedly moved relative to said supporting frame,
    (h) a set of braces for each of said spreader arms hingedly connected thereto intermediate their ends and to said supporting frame with said braces and said spreader arms collapsible upon each other and on said supporting frame when the panel is in its retracted position with respect to said side wall,
    (i) a latch pin movably carried by said connecting frame and extending transversely to the path of movement of said latch bar and engageable therewith to lock the freight engaging panel in a selected vertical position with respect to said supporting frame, and
    (j) a handle carried by said connecting frame and attached to one end of said latch pin for moving the same into and out of locking engagement with said latch bar.

2. An adjustable load spacer as defined by claim 1 wherein said means for connecting said opposite ends of said spreader arms to said supporting frame comprises slotted brackets carried by said supporting frame with said brackets receiving the free ends of a shaft carried by and connecting together said opposite ends of said spacer arms.

3. An adjustable load spacer of claim 1 further defined by including means for yieldably maintaining said latch pin and said handle in a latching relation with respect to said latch bar.

References Cited

UNITED STATES PATENTS

| | | | |
|---|---|---|---|
| 3,151,572 | 10/1964 | Moorhead et al. | 105—369 |
| 3,168,055 | 2/1965 | Vander Hyde et al. | 105—376 |
| 3,176,629 | 4/1965 | Shaver | 105—376 |
| 3,212,458 | 10/1965 | Robertson | 105—369 |
| 3,327,646 | 6/1967 | Shook | 105—369 |
| 3,327,647 | 6/1967 | Rolfe | 105—369 |
| 3,344,750 | 10/1967 | Kosfrewa | 105—369 |
| 3,345,955 | 10/1967 | Erickson | 105—369 |

DRAYTON E. HOFFMAN, Primary Examiner